United States Patent [19]

Tardif

[11] Patent Number: 5,230,640
[45] Date of Patent: Jul. 27, 1993

[54] CONNECTING DEVICE FOR ONE OR TWO ELECTRIC CABLES, AND PROCESS FOR MOUNTING THIS DEVICE ON THE END OF THE CABLE OR CABLES

[75] Inventor: Laurent Tardif, Paris, France

[73] Assignee: Cables Pirelli, Charenton le Pont, France

[21] Appl. No.: 848,015

[22] Filed: Mar. 9, 1992

[30] Foreign Application Priority Data

Mar. 12, 1991 [FR] France ................... 91 02949

[51] Int. Cl.⁵ .................................................. H01R 9/07
[52] U.S. Cl. ................................. 439/578; 439/932; 439/934; 174/88 C; 174/DIG. 8; 29/859
[58] Field of Search ............. 174/DIG. 8, 88 C, 74 C; 439/730, 932, 736, 933, 934, 874, 86, 88, 607; 29/859, 869, 872

[56] References Cited

U.S. PATENT DOCUMENTS

| | | | |
|---|---|---|---|
| 3,541,495 | 11/1970 | Ellis et al. | 439/932 |
| 3,605,077 | 9/1971 | Kaylor | 439/730 |
| 3,774,141 | 11/1973 | Condon | 439/730 |
| 4,304,616 | 12/1981 | Richardson | 174/DIG. 8 |
| 4,714,438 | 12/1987 | Williams | 439/932 |

FOREIGN PATENT DOCUMENTS

| | | |
|---|---|---|
| 0139483 | 9/1984 | European Pat. Off. |
| 0415082 | 3/1991 | European Pat. Off. |
| 435569 | 7/1991 | European Pat. Off. |
| 8219184 | 9/1982 | Fed. Rep. of Germany |
| 9002070 | 4/1990 | Fed. Rep. of Germany |
| 3837120 | 5/1990 | Fed. Rep. of Germany |
| 2339968 | 1/1977 | France |
| 2592825 | 7/1987 | France |
| 2643755 | 8/1990 | France ........................ 439/730 |
| 2046032 | 11/1980 | United Kingdom |

*Primary Examiner*—David Pirlot
*Attorney, Agent, or Firm*—Brooks Haidt Haffner & Delahunty

[57] ABSTRACT

The invention relates to a connecting device (200) to equip an end of an electric cable (100), including a multilayer sleeve having an axis (202) and having an insulating intermediate layer (204) interposed between two layers suitable for ensuring the guiding of an electric field.

According to the invention, only the end or ends (207) of the sleeve designed to cooperate with a cable end are in a state of radial expansion such that they present an inside diameter that is greater than the outside diameter of the corresponding cable end and which will be less than this outside diameter once retraction of the said ends of the sleeve has been brought about.

The invention also relates to a process for mounting this device on the cable or cables.

13 Claims, 3 Drawing Sheets

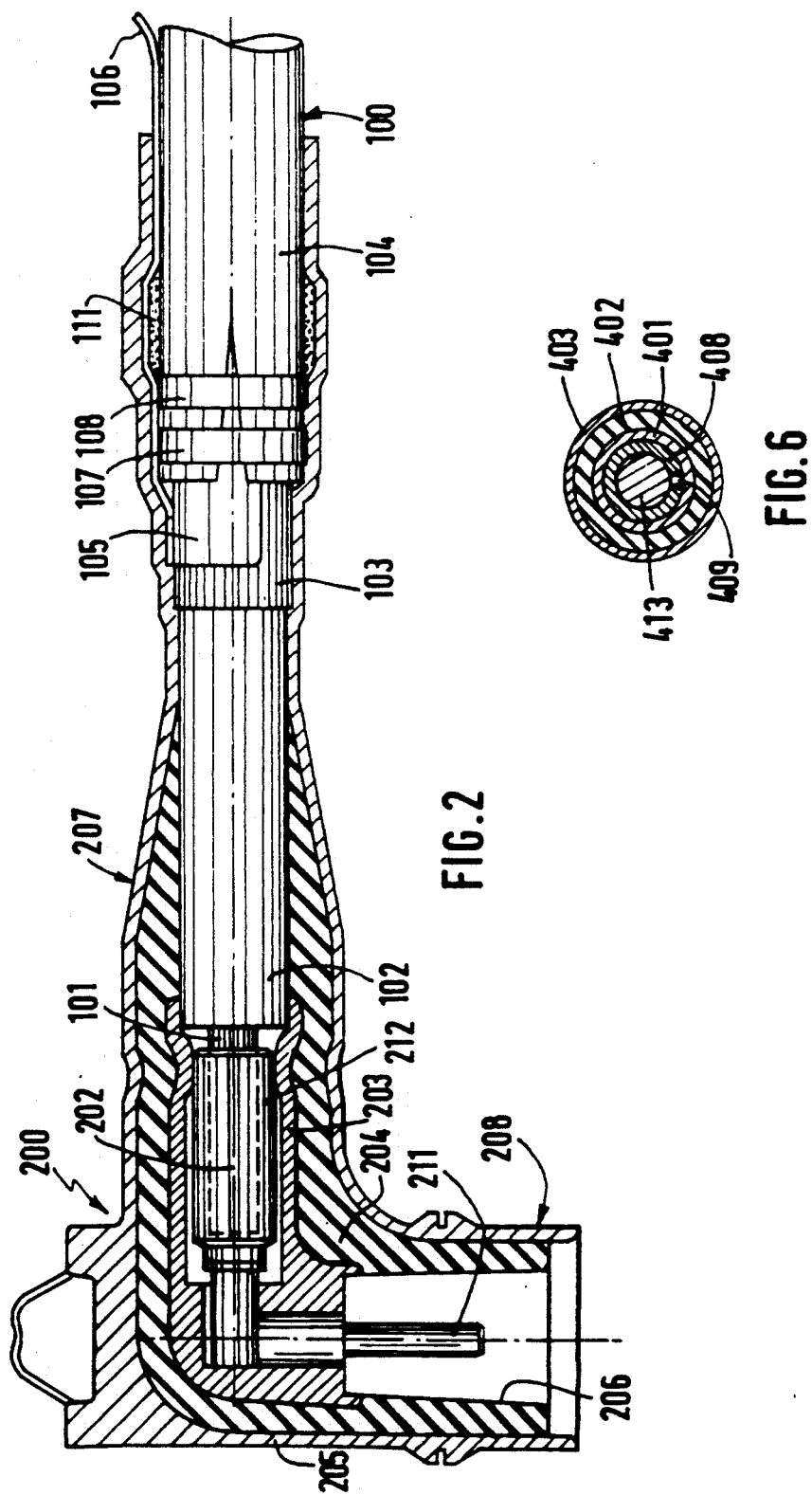

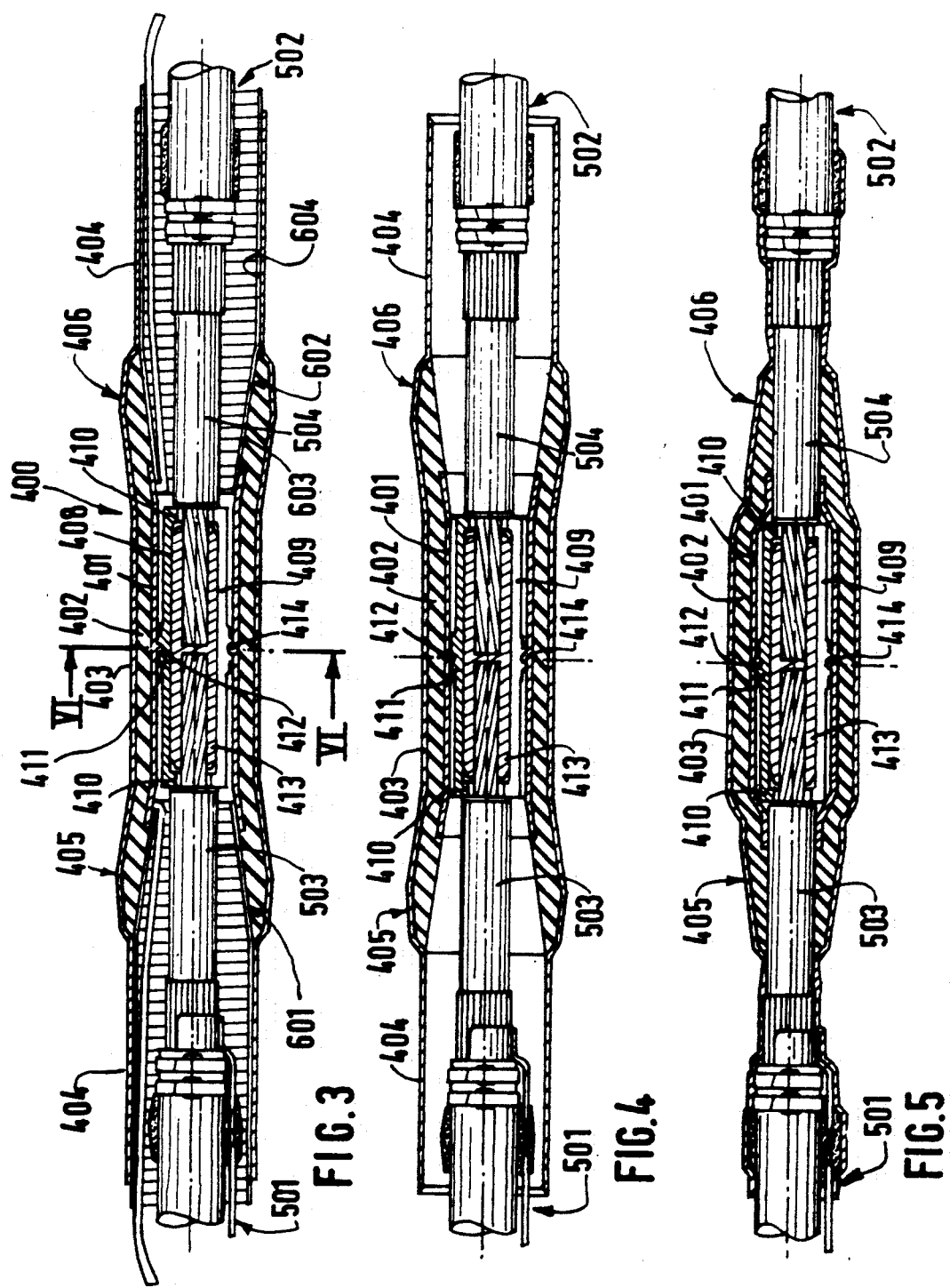

CONNECTING DEVICE FOR ONE OR TWO ELECTRIC CABLES, AND PROCESS FOR MOUNTING THIS DEVICE ON THE END OF THE CABLE OR CABLES

The invention relates to a connecting device to equip an end of an electric cable or to interconnect two ends of two electric cables, this device comprising a single-piece multilayer sleeve having an axis and having an insulating intermediate layer interposed between two radial internal and external layers suitable for the guiding of an electric field, this sleeve comprising a axially median portion housing electrical contact means designed to cooperate with a core of the cable or cables, a first end designed to cooperate with an insulated cable end and a second end designed to cooperate either with another connecting device, or with another insulated cable end.

It relates more particularly to medium voltage cables, i.e. those with a voltage rating of between 1 and 36 kV.

One particular problem that arises when equipping an electric cable end of a connecting device is that the internal diameter of the sleeve has to be adapted to the diameter of the cable in question. For this purpose, it necessary to have at one's disposal either several connecting devices of different sizes, each being designed to fit the diameter of the cable in question perfectly, or several adapter tubes of different thicknesses, each tube enabling the connecting device to be adapted to a cable of a given diameter.

These solutions are costly as they make it necessary to possess a large number of connecting devices or adapter tubes in order to adapt to a whole range of cables.

Another known solution consists in designing a straight cylindrical sleeve that can be expanded in its entirety over a range of diameters sufficiently large to be able to receive cables of different diametres, as taught in documents FR-A-2 592 825, EP-A-0 415 082 and GB-A-2 046 032.

This solution gives satisfaction. However, it is found that the expansion, and then retraction, of the whole of the sleeve takes quite a long time. Furthermore, it is not easy to hold the sleeve during expansion as it must not oppose the effect of expansion.

Finally, certain connecting devices cannot undergo expansion in their entirety, given their special shape or the fact that they include a non-expandable solid inner portion. This is the case, in particular, of plug-in connectors. Such devices can, therefore, be adapted to different cable diameters only through the use of the aforementioned adapter tubes.

The problem that the invention aims to solve is that of providing means permitting the adaptation of all types of connecting device to different cable diameters, simply and without using known adapter tubes.

The invention relates, for this purpose, to a connecting device of the type mentioned at the beginning of the description, characterized in that the said end or ends of the sleeve designed to cooperate with a cable end are in a state of radial expansion such that they present, at any point along the axis of the sleeve, an inside diameter that is greater than the outside diameter of the corresponding cable end at this point and which will be smaller than this outside diameter once retraction of the said ends of the sleeve has been caused, while the said axially median portion of the sleeve and, if applicable, the end of the sleeve designed to cooperate with another connecting device are in a state of radial non-expansion.

Thus, the operations involving prior expansion of the sleeve, followed by retraction onto the cables are quicker as they affect only one portion of the sleeve.

In addition, the sleeve can, at any time, be gripped by its non-expanded portions for the purpose of holding it.

Such a device can be of the type possessing a non-expandable end, not designed to be applied around a cable end: in this case, only the end designed to cooperate with the cable will be subjected to the operations of expansion and then retraction.

The aforementioned device is such that it has previously undergone expansion and can then be fitted directly on site by an operator.

The invention also relates to such a device, in the form it takes prior to expansion and which further incorporates in it means for holding in expanded position, i.e. a device characterized in that the said end or ends of the sleeve designed to cooperate with a cable end comprise holding means cable of holding them in a state of radial expansion, while the said axially median portion of the sleeve and, if applicable, the end of the sleeve designed to cooperate with another connecting device will be in a state of radial non-expansion.

According to a first form of embodiment, the said holding means are such that the expandable end or ends of the sleeve include a portion made of heat shrinking material, while the rest of the sleeve is made of a non-heat shrinking material.

According to a second form of embodiment, the said holding means comprise traction lugs integral with an external surface of each of the expandable ends of the sleeve.

The invention further relates to a process for mounting such a connecting device on the end of an electric cable, characterized by the steps of radially expanding only the said expandable end or ends of the sleeve to an extent such that they have, at any point along the axis of the sleeve, an inside diameter that is greater than the outside diameter of the corresponding cable end at this point, while holding the said axially median portion of the sleeve and, if applicable, the end of the sleeve designed to cooperate with another connecting device in a state of radial non-expansion; fitting the cable end or ends inside the connecting device thus expanded and electrically connecting the core of the cable or cables to the said electrical contact means; and causing the said expanded end or ends of the sleeve to retract onto the cable end or ends.

Further details and advantages of the invention will emerge in the course of the following description of a preferred, but non-limitative form of embodiment, with reference to the annexed drawings, wherein:

FIG. 2 is a similar view, after the connector has partially returned to its original dimensions on the cable.

FIG. 3 is a longitudinal cross-sectional view of a junction body according to the invention, before it returns to its original dimensions on a junction between cables;

FIG. 4 is a variant of FIG. 3;

FIG. 5 is a view of the junction body in FIGS. 3 or 4, after it has returned its original dimensions on the cables; and FIG. 6 is a cross-sectional view along line VI—VI of FIG. 3.

Figure 1:
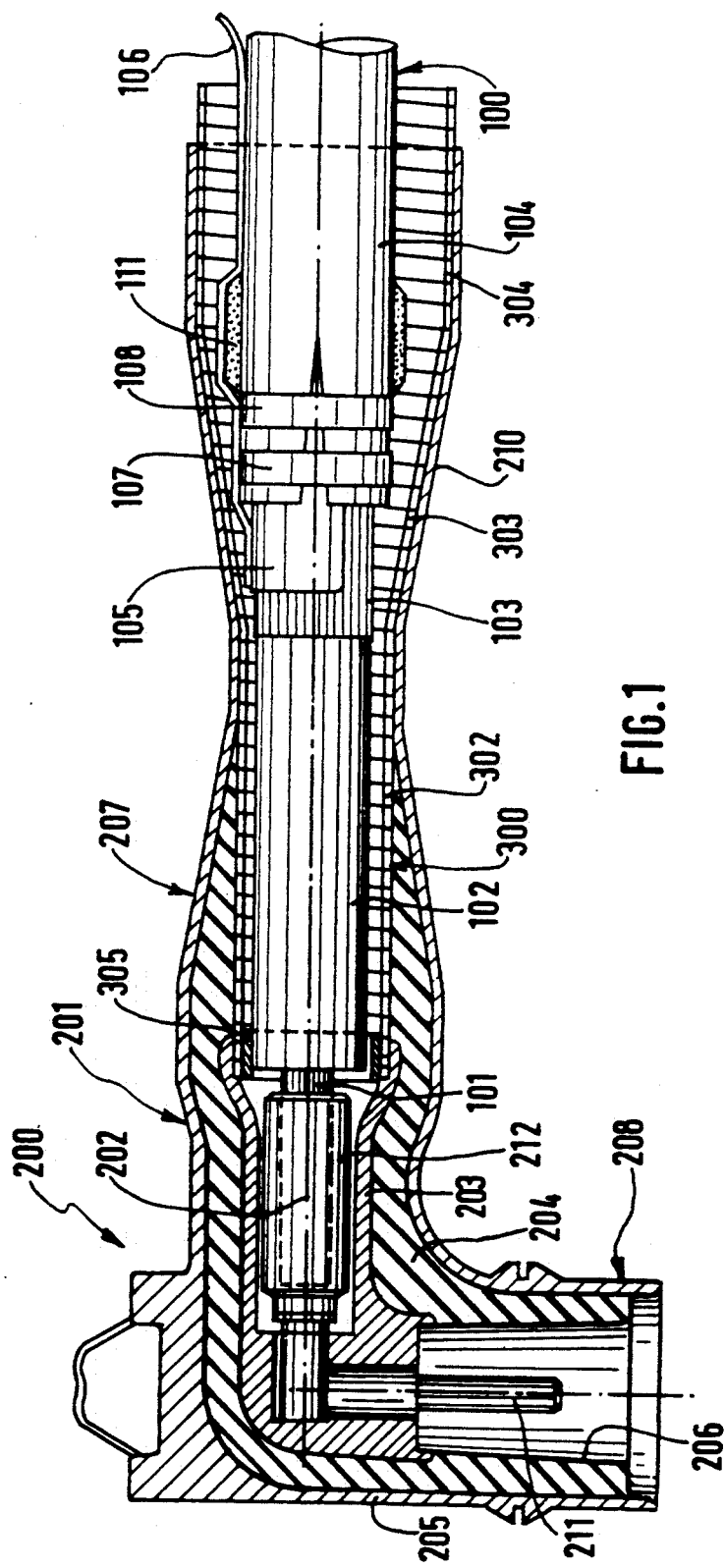
FIG. 1 is a longitudinal cross-sectional view of a connector according to the invention, before it partially returns to its original dimensions on a cable.

FIGS. 1 and 2 show a connector 200 placed on an end of a cable 100. The cable end has been bared in a manner known per se. The figures show, radially, from inside to outside, a conductive core 101, an insulating layer 102, a conductive shield 103 and an insulating external sheath 104. A conductive plate 105 is interposed between conductive screen 103 and external sheath 104. It is maintained by collars 107, 108 clasping external sheath 104. An earthing braid 106 is connected to conductive plate 105. A ring of sealing compound 111 covers one end of external sheath 104.

Connector 200 comprises, in a manner known per se, un multilayer sleeve 201, the longitudinal cross-section of which has, in this example, the shape of an L, this sleeve having an axis 202 and comprising, as viewed radially, a conductive internal layer 203, an insulating intermediate layer 204 and a conductive outer layer 205. The internal and external layers could, alternatively, present other electrical characteristics suitable for ensuring the guiding of an electric field, such as a semiconductive characteristic.

In the vicinity of an end 207 of the sleeve receiving cable 100, and of another plug-in end 208, the insulating layer 204 comes into contact with an internal surface 206 of the sleeve. Similarly, conductive external layer 205 comes into contact with the external surface of the insulating layer 204 at the end of the sleeve receiving the cable, which end has, for this purpose, a conical shape.

At the end of the sleeve 201 receiving cable 100, the external layer has a cylindrical extension 210, which extends along the axis 201 of the sleeve over a length equal, in this example, to approximately half that of sleeve 201.

Sleeve 201 is made of an elastomer material having a degree of elasticity making it possible, after expansion and then retraction of the sleeve, to fit it on cables of substantially different diameters, more precisely cables the diameters of which can vary by up to 100%. One particularly suitable elastomer is EPDM.

The conical end 207 of the sleeve and its cylindrical extension 210 have, at rest and at any point along axis 202 of the sleeve, an inside diameter a little smaller than the outside diameter at this point of the end of the cable of smallest diameter, chosen from a series of cables of different dimensions, that it is wished to be able to adapt to plug 200. The inside diameter of conical end 207 and of cylindrical extension 210 will further be chosen in such a way that these portions exert, after their expansion and then retraction, a clamping force on the said smallest diameter cable.

In a manner known per se, a socket 212 is crimped onto the conductive core 101 of cable 100, a male contact piece 211 being secured by screwing onto a free end of socket 212.

The procedure for mounting connector 200 on cable 100 will now be described. In an initial stage, the conical end 207 of sleeve 201 and its cylindrical extension 210 are radially expanded to an inside diameter greater than the outside diameter of a corresponding portion of the cable to be covered.

In this example, the conical end 207 of the sleeve 201 and its cylindrical extension 210 have undergone in-works expansion using means known per se, for example by using a vacuum chambre or a mandrel, and a tube 300 has been inserted inside them in order to maintain them in a state of expansion.

Tube 300 is constituted by a tearable strip and comprises a small diameter cylindrical portion 302, extended by a conical portion 303 widening towards a large diameter cylindrical portion 304, the first portion mentioned covering a region of the cable in which appears its insulating layer 102, and the other two portions mentioned covering the means for earthing the cable, and the sealing compound 111.

In a manner known per se, a ring 305 is disposed on a free end of the small diameter cylindrical portion 302 of tube 300 to facilitate the subsequent withdrawal thereof.

The conical end 207 of sleeve 201 of the connector bears on small diameter cylindrical portion 302 of tube 300, while its cylindrical extension 210 bears on conical portion 303 and large diameter cylindrical portion 304.

In a second on-site mounting step, the cable end is prepared so as to be bared and equipped, on one hand, with its socket 212 and, on the other hand, with its earthing means 105 to 108, 111, and then it is inserted inside connector 200. Male contact piece 211 is then screwed onto the free end of socket 212. Next, tube 300 is gradually removed by an operator, starting from its end located the furthest inside the connector, by tearing the strip. Conical end 207 and cylindrical extension 210 of sleeve 201 then retract by elasticity over the corresponding parts of cable 100. The resulting situation is as illustrated in FIG. 2.

It will be noted that cylindrical extension 210 covers the cable earthing means after the fashion of a conventional earthing cap, formed by a tubular sheath that partially returns to its original dimensions, independently of the connector.

According to a less advantageous variant, not represented in the figures, connector 200 does not include this cylindrical extension 210, the latter being replaced by a conventional earthing cap disposed on the cable prior to retraction of the connector. In this case, conical end 207 of the sleeve covers the earthing cap over a short length.

Alternatively, conical end 207 of sleeve 201 and its cylindrical extension 210 bear, on an external surface, traction lugs permitting their radial expansion thanks to a device providing traction on these traction lugs, radially towards the outside of the connector.

Again alternatively, at conical end 207 of sleeve 201, the external conductive layer 205 and its cylindrical extension 210 have a heat shrinking characteristic while the rest of the sleeve has a non-heat shrinking characteristic.

The procedure for mounting such a connector on cable 100 comprises an initial step in which conical end 207 of connector 201 and its cylindrical extension 210 are heated and then radially expanded in works using means known in themselves, for example a vacuum chamber or a mandrel, and then they are cooled down and subsequently remain in expanded state.

In a second on-site mounting step, the conical end 207 of sleeve 201 and its cylindrical extension 210 are heated, so that they retract onto cable 100.

The invention applies in a perfectly similar way to a junction body 400 designed to connect the ends of two cables 501, 502, these being of a design identical with that, 100, of FIGS. 1 and 2.

Junction body 400 is constituted by a multilayer sleeve comprising, as viewed radially, a conductive internal layer 401, an insulating intermediate layer 402 and a conductive external layer 403. In a way similar to that of multi-layer sleeve 201 of FIGS. 1 and 2, insulating intermediate layer 402 comes into contact with an internal surface of the junction body, and the conductive external layer has a cylindrical extension 404 at two ends which extends over approximately 40% of the length of the junction body. The junction body has two conical ends 405, 406 (FIG. 5).

In FIGS. 3 and 4, the conical ends 405, 406 and the cylindrical extensions 404 of the junction body are in a state of radial expansion, while a central region of the junction body contained between the two conical ends is not expanded.

In the example in FIG. 3, junction body 400 is maintained in a state of expansion mechanically, by means of two tubes, 601, 602, formed by a tearable strip. Each tube has a frustoconical portion 603, extended on a larger diameter side, by a cylindrical portion 604, the frustoconical portion 603 supporting a conical end 406 of junction body 400 and the cylindrical portion 604 supporting the cylindrical extension 404 thereof.

A cylindrical sheath 408 has a longitudinal slit 409 and, at two ends, two radially inwardly projecting flanges 410. It comprises, on an external surface and in an axially median region, an annular rim 411 in which is provided an annular groove 412. This sheath is conductive and is made of an elastic material such as EPDM.

Sheath 408 is arranged to cover closely a crimped socket 413 joining the two cables 501, 502, with the two flanges 410 of the sheath facing two ends of the crimped socket. It extends axially from an insulating layer 503 of one cable to an insulating layer 504 of the second cable.

The internal layer 401 of junction body 400 bears, on an internal face and in an axially median region, an annular rim 414 the dimensions of which are adapted so that it is received in the annular groove 412 of sheath 408.

Sheath 408 performs several functions. On one hand, it adapts the inside diameter of junction body 400 to the outside diameter of crimped socket 413. On the other hand, being in contact with these two components, it electrically connects them and permits the discharge of heat, from the crimped socket 413 to junction body 400.

The exemple given in FIG. 4 is distinguished from that of FIG. 3 in that junction body 400 includes a portion having a heat shrinking characteristic and is thus maintained in expanded state without there being any need to use support tubes.

The non expanded central region of the junction body of FIGS. 3 and 4 has an inside diameter greater than the largest diameter of the most voluminous cable that it is wished to be able to adapt to this junction body so that the latter can, in all cases, be fitted onto one of cables 501, 502 before the assembly thereof.

On site, the junction body being fitted onto one of the cables, assembly between the cores thereof is achieved by means of crimped socket 413. Then, sheath 408 is fitted onto crimped socket 413 after being widened, making using of its elasticity. Next, the junction body is fitted over sheath 408 and is caused to retract. This situation is illustrated in FIG. 5, wherein conical ends 405, 406 of the junction body bear on insulating layer 503, 504 of the cables, and its cylindrical extensions 404 bear on conductive shields and insulating external sheaths of the cables.

In all cases, it will be advantageous for the cylindrical extension of the conductive outer layer of the connector or of the junction body to extend over a length greater than 20% of that of the latter.

I claim:

1. Connecting device (200) to equip an end of an electric cable (100) or to interconnect two ends of two electric cables, this device comprising a single-piece multilayer sleeve having an axis (202) and having an insulating intermediate layer (204) interposed between two radially internal (203) and external (205) layers suitable for the guiding of an electric field, said sleeve comprising an axially median portion for housing electrical contact means (211,212) designed to cooperate with a core of the cable or cables, a first end (207; 405) designed to cooperate with an insulated cable end and a second end (406) designed to cooperate either with another connecting device, or with another insulated cable end, characterized in that the said end or ends (207; 405, 406) of the sleeve designed to cooperate with a cable end are in a state of radial expansion prior to application to the cable such that they present, at any point along the axis (202) of the sleeve, an inside diameter that is greater than the outside diameter of the corresponding cable end at this point and which will be smaller than this outside diameter once retraction of said ends of the sleeve has been brought about, said axially median portion of the sleeve being in a state of radial non-expansion prior to the application of said sleeve to a cable and, when the second end (208) of the sleeve is designed to cooperate with another connecting device, the last-mentioned said end is in a state of radial non-expansion prior to the application to said another connecting device, said median portion having an unexpanded inside diameter less than the expanded inside diameter of said end or ends.

2. Device according to claim 1, wherein the expanded end or ends (207; 405, 406) of the sleeve comprise a portion made of a heat shrinking material, while the rest of the sleeve is made of a non-heat shrinking material.

3. Device according to claim 1, in which the expanded end or ends (207; 405, 406) of the sleeve are made of an elastic material.

4. Connecting device (200) to equip an end or an electric cable (100) or to interconnect two ends of two electric cables, said device comprising a single-piece multilayer sleeve having an axis (202) and having an insulating intermediate layer (204) interposed between two radially internal (203) and external (205) layers suitable for ensuring the guiding of an electric field, said sleeve comprising an axially median portion for housing electrical contact means (211, 212) designed to cooperate with a core of the cable or cables, a first end (207; 405) designed to cooperate with an insulated cable end and a second end (406) designed to cooperate either with another connecting device, or with another insulated cable end, characterized in that said end or ends (207; 405, 406) of the sleeve designed to cooperate with a cable end comprise holding means capable of holding them in a state of radial expansion, the said axially median portion of the sleeve being in a state of radial non-expansion prior to the application of said sleeve to a cable and, when the second end (208) of the sleeve is designed to cooperate with another connecting device, the last-mentioned said end will be in a state of radial non-expansion prior to the application to said another connecting device, said median portion having an unexpanded inside diameter less than the expanded inside diameter of said end or ends.

5. Device according to claim 4, wherein the said holding means are such that the expandable end or ends (207; 405, 406) of the sleeve include a portion made of heat shrinking material, while the rest of the sleeve is made of a non-heat shrinking material.

6. Device according to claim 4, wherein, at the end (207) or ends (405, 406) of the sleeve cooperating with a cable end, the external layer (205) extends axially beyond the insulating layer (204) in a cylindrical extension (210) to an extent to which the said extension is able to cover a bared portion of a conductive shield (103) and an external sheath of the cable.

7. Process for mounting a connecting device (200) on the end of an electric cable (100) or between two ends of two electric cables (501, 502), each cable comprising a conductive core (101), an insulating layer (102) covering the core, a conductive shield (103) covering the insulating layer and an external sheath (104) covering the conductive shield (103), the connecting device comprising a single-piece multilayer sleeve having an axis (202) and having an insulating intermediate layer (204) interposed between two radially internal (203) and external (205) layers suitable for ensuring the guiding of an electric field, said sleeve comprising an axially median portion for housing electrical contact means (211, 212) designed to cooperate with a core of the cable or cables, a first end (207; 405) designed to cooperate with an insulated cable end and a second end (406) designed to cooperate either with another connecting device, or with another insulated cable end, the end or ends (207; 405, 406) of the sleeve designed to cooperate with a cable end being capable of being brought to a state of radial expansion, said axially median portion of the sleeve being in a state of radial non-expansion prior to the application of said sleeve to a cable and, when the end (208) of the sleeve designed to cooperate with another connecting device the last-mentioned said end is in a state of radial non-expansion, characterized by the following steps:

radially expanding only the said expandable end or ends (207; 405, 406) of the sleeve to an extent such that they have, at any point along the axis (202) of the sleeve, an inside diameter that is greater than the outside diameter of the corresponding cable end at this point, while holding the said axially median portion of the sleeve and, when the end (208) of the sleeve is designed to cooperate with another connecting device, holding the last-mentioned said end in a state of radial non-expansion;

fitting the cable end or ends inside the connecting device thus expanded and electrically connecting the core (101) of the cable or cables to the said electrical contact means (211);

and causing the said expanded end or ends (207; 405, 406) of the sleeve to retract onto the cable end or ends.

8. Connecting device (200) to equip an end of an electric cable (100) or to interconnect two ends of two electric cables, said device comprising a single-piece multilayer sleeve having an axis (202) and having an insulating intermediate layer (204) interposed between two radially internal (203) and external (205) layers suitable for the guiding of an electric field, the sleeve comprising an axially median portion for housing electrical contact means (211, 212) designed to cooperate with a core of the cable or cables, a first end (207; 405) designed to cooperate with an insulated cable end and a second end (406) designed to cooperate either with another connecting device, or with another insulated cable end, characterized in that the said end or ends (207; 405, 406) of the sleeve designed to cooperate with a cable end are in a state of radial expansion such that they present, at any point along the axis (202) of the sleeve, an inside diameter that is greater than the outside diameter of the corresponding cable end at this point and which will be smaller than this outside diameter once retraction of said ends of the sleeve has been brought about, the expanded end or ends (207; 405, 406) of the sleeve bear, on an external surface, traction lugs, and the connecting device comprises expansion means cooperating with the said traction lugs to apply thereto an outwardly radially directed tensile force, while the said axially median portion of the sleeve and the end (208) of the sleeve designed to cooperate with another connecting device, are in a state of radial non-expansion.

9. Connecting device (200) to equip an end of an electric cable (100) or to interconnect two ends of two electric cables, said device comprising a single-piece multilayer sleeve having an axis (202) and having an insulating intermediate layer (204) interposed between two radially internal (203) and external (205) layers suitable for the guiding of an electric field, the sleeve comprising an axially median portion for housing electrical contact means (211, 212) designed to cooperate with a core of the cable or cables, a first end (207; 405) designed to cooperate with an insulated cable end and a second end (406) designed to cooperate either with another connecting device, or with another insulated cable end, characterized in that the said end or ends (207; 405, 406) of the sleeve are of elastic material and are designed to cooperate with a cable end are in a state of radial expansion such that they present, at any point along the axis (202) of the sleeve, an inside diameter that is greater than the outside diameter of the corresponding cable end at this point and which will be smaller than this outside diameter once retraction of said ends of the sleeve has been brought about, while the said axially median portion of the sleeve and the end (208) of the sleeve designed to cooperate with another connecting device, are in a state of radial non-expansion, the expanded said end or ends having a tube (300) therein, said tube being constituted by a tearable strip on which the said expanded end bears.

10. Connecting device (200) to equip an end of an electric cable (100) or to interconnect two ends of two electric cables, said device comprising a single-piece multilayer sleeve having an axis (202) and having an insulating intermediate layer (204) interposed between two radially internal (203) and external (205) layers suitable for ensuring the guiding of an electric field, the sleeve comprising an axially median portion for housing electrical contact means (211, 212) designed to cooperate with a core of the cable or cables, a first end (207; 405) designed to cooperate with an insulated cable end and a second end (406) designed to cooperate either with another connecting device, or with another insulated cable end, characterized in that the said end or ends (207; 405, 406) of the sleeve designed to cooperate with a cable end comprise holding means capable of holding them in a state of radial expansion, while the said axially median portion of the sleeve and the end (208) of the sleeve designed to cooperate with another connecting device will be in a state of radial non-expansion, said holding means comprising traction lugs integral with an external surface of each of the expandable ends (207; 405, 406) of the sleeve.

11. Device according to claim 10 wherein, at the end (207) or ends (405, 406) of the sleeve cooperating with a cable end, the external layer (205) extends axially beyond the insulating layer (204) in a cylindrical extension (210) to an extent to which the said extension is able to cover a bared portion of a conductive shield (103) and an external sheath of the cable.

12. Process for mounting a connecting device (200) on the end of an electric cable (100) or between two ends of two electric cables (501, 502), each cable comprising a conductive core (101), an insulating layer (102) covering the core, a conductive shield (103) covering the insulating layer and an external sheath (104) covering the conductive shield (103), the connecting device comprising a single-piece multilayer sleeve of elastic material having an axis (202) and having an insulating intermediate layer (204) interposed between two radially internal (203) and external (205) layers suitable for ensuring the guiding of an electric field, said sleeve comprising an axially median portion for housing electrical contact means (211, 212) designed to cooperate with a core of the cable or cables, a first end (207; 405) designed to cooperate with an insulated cable end and a second end (406) designed to cooperate either with another connecting device, or with another insulated cable end, the end or ends (207; 405, 406) of the sleeve designed to cooperate with a cable end being capable of being brought to a state of radial expansion while the said axially median portion of the sleeve and the end (208) of the sleeve designed to cooperate with another connecting device will be in a state of radial non-expansion, characterized by the following steps:

radially expanding only the said expandable end or ends (207; 405, 406) of the sleeve to an extent such that they have, at any point along the axis (202) of the sleeve, an inside diameter that is greater than the outside diameter of the corresponding cable end at this point, while holding the said axially median portion of the sleeve and the end (208) of the sleeve designed to cooperate with another connecting device in a state of radial non-expansion after expansion of the end or ends (207; 405, 406) of the sleeve designed to cooperate with the end or ends of the cable, introducing inside each of them a tube (300) having an inside diameter greater than the outside diameter of the corresponding cable end and suitable for maintaining the end or ends (207) of the sleeve in a state of expansion;

fitting the cable end or ends inside the connecting device thus expanded and electrically connecting the core (101) of the cable or cables to the electrical contact means (211);

and after fitting each cable end inside the corresponding tube (300), withdrawing said tube (300) causing the said expanded end or ends (207; 405, 406) of the sleeve to retract onto the cable end or ends.

13. Process for mounting a connecting device (200) on the end of an electric cable (100) or between two ends of two electric cables (501, 502), each cable comprising a conductive core (101), an insulating layer (102) covering the core, a conductive shield (103) covering the insulating layer and an external sheath (104) covering the conductive shield (103), the connecting device comprising a single-piece multilayer sleeve having an axis (202) and having an insulating intermediate layer (204) interposed between two radially internal (203) and external (205) layers suitable for ensuring the guiding of an electric field, said sleeve comprising an axially median portion for housing electrical contact means (211, 212) designed to cooperate with a core of the cable or cables, a first end (207; 405) designed to cooperate with an insulated cable end and a second end (406) designed to cooperate either with another connecting device, or with another insulated cable end, the end or ends (207; 405, 406) of the sleeve designed to cooperate with a cable end being capable of being brought to a state of radial expansion and being heat shrinkable, while the said axially median portion of the sleeve and the end (208) of the sleeve designed to cooperate with another connecting device will be in a state of radial non-expansion, characterized by the following steps:

radially expanding while applying heat only the said expandable end or ends (207; 405, 406) of the sleeve to an extent such that they have, at any point along the axis (202) of the sleeve, an inside diameter that is greater than the outside diameter of the corresponding cable and at this point, while holding the said axially median portion of the sleeve and the end (208) of the sleeve designed to cooperate with another connecting device in a state of radial non-expansion;

cooling the said end or ends in order to maintain them in the expanded state;

fitting the cable end or ends inside the connecting device thus expanded and electrically connecting the core (101) of the cable or cables to the electrical contact means (211);

and causing the said expanded end or ends (207; 405, 406) of the sleeve to shrink and retract onto the cable end or ends by again heating the expanded end or ends.

* * * * *

UNITED STATES PATENT AND TRADEMARK OFFICE
CERTIFICATE OF CORRECTION

PATENT NO. : 5,230,640
DATED : July 27, 1993
INVENTOR(S) : Tardif

It is certified that error appears in the above-indentified patent and that said Letters Patent is hereby corrected as shown below:

TITLE PAGE
Replace Abstract as printed in the Letters Patent by the following:

--A multi-layer sleeve for covering a joint between a pair of cables or between a cable and a connector. The sleeve has an insulating layer between conductive layers, a pair of axial end portions and an intermediate portion axially between the end portions. When the sleeve is to cover a joint between a pair of cables, both end portions are expanded radially so as to have an inside diameter greater than the diameters of the cables to be joined. When covering a joint between a cable and a connector, only the end portion which is to cover the cable is expanded radially to an inside diameter greater than the cable diameter. In both cases, the intermediate portion is not expanded radially with respect to its rest state. Also, a method of making and using such sleeve.--

Signed and Sealed this

Twenty-ninth Day of March, 1994

Attest:

BRUCE LEHMAN

*Attesting Officer*    *Commissioner of Patents and Trademarks*